United States Patent
Iba et al.

(10) Patent No.: US 8,451,546 B2
(45) Date of Patent: May 28, 2013

(54) IMAGE PICKUP LENS, IMAGE PICKUP DEVICE USING SAME, AND PORTABLE DEVICE EQUIPPED WITH IMAGE PICKUP DEVICE

(75) Inventors: Takumi Iba, Kyoto (JP); Nami Sawada, Hyogo (JP); Masatoshi Yamashita, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/510,498

(22) PCT Filed: Aug. 30, 2010

(86) PCT No.: PCT/JP2010/005327
§ 371 (c)(1),
(2), (4) Date: May 17, 2012

(87) PCT Pub. No.: WO2011/061882
PCT Pub. Date: May 26, 2011

(65) Prior Publication Data
US 2012/0229695 A1    Sep. 13, 2012

(30) Foreign Application Priority Data

Nov. 20, 2009 (JP) .................................. 2009-265411

(51) Int. Cl.
*G02B 3/02* (2006.01)
*G02B 9/34* (2006.01)
(52) U.S. Cl.
USPC ............................. 359/715; 359/740; 359/773
(58) Field of Classification Search
USPC .......................................... 359/715, 740, 773
See application file for complete search history.

(56) References Cited

U.S. PATENT DOCUMENTS

| 2007/0008625 | A1 | 1/2007 | Park et al. |
| 2007/0188891 | A1 | 8/2007 | Shinohara |
| 2007/0242370 | A1 | 10/2007 | Fukuta et al. |
| 2010/0172024 | A1 | 7/2010 | Sakagami |
| 2010/0309367 | A1* | 12/2010 | Iba et al. ........................ 359/715 |

FOREIGN PATENT DOCUMENTS

| JP | 2007-264498 | 10/2007 |
| JP | 2008-090150 | 4/2008 |
| JP | 4317933 | 8/2009 |

\* cited by examiner

*Primary Examiner* — Evelyn A. Lester
(74) *Attorney, Agent, or Firm* — Hamre, Schumann, Mueller & Larson, P.C.

(57) ABSTRACT

An image pickup lens compatible with small high-pixel image pickup elements (e.g., from CCD and CMOS image sensors having a pixel pitch of 1.75 μm and a pixel count of 5 mega pixels to CCD and CMOS image sensors having a pixel pitch of 1.4 μm and a pixel count of 8 mega pixels) is provided. An image pickup lens 7 includes, in order from an object side to an image surface side: an aperture stop 5, a first lens 1 having positive power; a second lens 2 that is a meniscus lens having negative power and whose lens surface facing the image surface side is concave; a third lens 3 that is a meniscus lens having positive power and whose lens surface facing the image surface side is convex; and a fourth lens 4 that has negative power, whose lens surfaces are both aspherical and whose lens surface facing the image surface side is concave near the optical axis. A diffractive optical element is formed on one of the lens surfaces of the first lens 1 or the second lens 2.

5 Claims, 12 Drawing Sheets

IMAGE PICKUP LENS, IMAGE PICKUP DEVICE USING SAME, AND PORTABLE DEVICE EQUIPPED WITH IMAGE PICKUP DEVICE

TECHNICAL FIELD

The present invention relates to an image pickup lens suited to small portable devices, such as mobile phones, digital cameras and small cameras, equipped with an image pickup device. The present invention also relates to an image pickup device using the image pickup lens and to a portable device equipped with the image pickup device.

BACKGROUND ART

In recent years, small portable devices, such as mobile phones, equipped with an image pickup device (camera module) have become widely popular, and taking pictures instantly with such small portable devices has become a common practice. For small image pickup devices incorporated in such a small portable device, an image pickup lens composed of four lenses is proposed (see Patent Document 1, for example). This image pickup lens is compact, has a small full open F number and allows an image surface to be flat from the center to the periphery. At the same time, the image pickup lens has high image quality.

The image pickup lens described in Patent Document 1 includes, in order from the object side to the image surface side: an aperture stop, a first lens that is a biconvex lens having positive refractive power; a second lens that is a negative meniscus lens having negative refractive power and whose lens surface facing the object side is convex; a third lens that is a positive meniscus lens whose lens surface facing the image surface side is convex; and a fourth lens configured to have negative refractive power in the proximity of the optical axis but to have larger positive refractive power toward the periphery of the lens.

PRIOR ART DOCUMENT

Patent Document

Patent Document 1: JP 2008-090150 A

SUMMARY OF THE INVENTION

Problem to be Solved by the Invention

For image pickup devices incorporated in small portable devices such as mobile phones, image pickup lenses compatible with small high-pixel image pickup elements (e.g., from CCD and CMOS image sensors having a pixel pitch of 1.75 μm and a pixel count of 5 mega pixels to CCD and CMOS image sensors having a pixel pitch of 1.4 μm and a pixel count of 8 mega pixels) are demanded in recent years in order to further enhance the resolution performance.

Although an image pickup device using the image pickup lens described in Patent Document 1 is compact, the image pickup lens is not compatible with small high-pixel image pickup elements (e.g., from CCD and CMOS image sensors having a pixel pitch of 1.75 μm and a pixel count of 5 mega pixels to CCD and CMOS image sensors having a pixel pitch of 1.4 μm and a pixel count of 8 mega pixels), so that the image pickup device is not sufficient for achieving enhancement of the high resolution performance.

With the foregoing in mind, an object of the present invention is to provide an image pickup lens compatible with small high-pixel image pickup elements (e.g., from CCD and CMOS image sensors having a pixel pitch of 1.75 μm and a pixel count of 5 mega pixels to CCD and CMOS image sensors having a pixel pitch of 1.4 μm and a pixel count of 8 mega pixels), a high-performance and compact image pickup device having high resolution performance using the image pickup lens, and a high-performance and compact portable device equipped with the image pickup device.

Means for Solving Problem

In order to achieve the above object, the image pickup lens of the present invention includes, in order from an object side to an image surface side: a first lens having positive power; a second lens that is a meniscus lens having negative power and whose lens surface facing the image surface side is concave; a third lens that is a meniscus lens having positive power and whose lens surface facing the image surface side is convex; and a fourth lens that has negative power, whose lens surfaces are both aspherical and whose lens surface facing the image surface side is concave near an optical axis. A diffractive optical element is formed on one of the lens surfaces of the first lens or the second lens.

According to the configuration of the image pickup lens of the present invention, a pair of meniscus lenses with lens surfaces facing each other being concave is used for the second and third lenses. Thus, it is possible to reduce the angle at which a ray enters the second lens and the third lens to reduce ray aberration. Further, since the diffractive optical element is formed on one of the lens surfaces of the first lens or the second lens, chromatic aberration can be corrected favorably. Furthermore, because the lens surfaces of the fourth lens are both aspherical, distortion and field curvature can be corrected favorably.

And for these reasons, according to the configuration of the image pickup lens of the present invention, it is possible to provide an image pickup lens composed of four lenses that allows favorable correction of a variety of aberrations and is compatible with small high-pixel image pickup elements (e.g., from CCD and CMOS image sensors having a pixel pitch of 1.75 μm and a pixel count of 5 mega pixels to CCD and CMOS image sensors having a pixel pitch of 1.4 μm and a pixel count of 8 mega pixels) incorporated in small portable devices such as mobile phones. As described above, according to the configuration of the image pickup lens of the present invention, the image pickup lens can be made compatible with small high-pixel image pickup elements regardless of the lens material. Thus, it is possible to reduce the cost by using plastic as the lens material.

In the configuration of the image pickup lens of the present invention, the image pickup lens preferably satisfies the following conditional expression (1).

$$TL/f < 1.31 \tag{1}$$

where f is a focal length of an overall optical system, and TL is an overall length of the optical system.

The conditional expression (1) is an expression representing the compactness (small optical overall length). If the conditional expression (1) is satisfied, a thinned (downsized) image pickup lens that allows further correction of distortion can be provided.

Further, in the configuration of the image pickup lens according to the present invention, the first lens is preferably a biconvex lens. According to this preferred example, positive power can be distributed at each lens surface. Thus, it is possible to provide an image pickup lens that causes less aberration and can be made thinner (downsized).

Further, in the configuration of the image pickup lens according to the present invention, at least the first lens or the second lens on which the diffractive optical element is formed is preferably a plastic lens. This preferred example not only makes molding of the lens including the formation of the diffractive optical element easy but also is advantageous in terms of material costs, and by extension, production costs.

The image pickup device according to the present invention includes: an image pickup element for converting an optical signal corresponding to an object into an image signal and outputting the image signal; and an image pickup lens for forming an image of the object onto an image pickup surface of the image pickup element. The image pickup lens of the present invention is used as the image pickup lens.

According to the configuration of the image pickup device of the present invention, the image pickup lens of the present invention is used as the image pickup lens. Thus, it is possible to provide a high-performance and compact image pickup device having high resolution performance.

The portable device of the present invention is equipped with the image pickup device of the present invention.

According to the configuration of the portable device of the present invention, the portable device is equipped with the image pickup device of the present invention. Thus, it is possible to provide a high-performance and compact portable device such as a mobile phone.

Effects of the Invention

As described above, according to the present invention, it is possible to provide an image pickup lens compatible with small high-pixel image pickup elements (e.g., from CCD and CMOS image sensors having a pixel pitch of 1.75 μm and a pixel count of 5 mega pixels to CCD and CMOS image sensors having a pixel pitch of 1.4 μm and a pixel count of 8 mega pixels), a high-performance and compact image pickup device having high resolution performance using the image pickup lens, and a high-performance and compact portable device equipped with the image pickup device.

BRIEF DESCRIPTION OF THE DRAWINGS

FIG. 2(a) is a graph of spherical aberration (graph of longitudinal chromatic aberration), FIG. 2(b) is a graph of astigmatism, and FIG. 2(c) is a graph of distortion.

FIG. 4(a) is a graph of spherical aberration (graph of longitudinal chromatic aberration), FIG. 4(b) is a graph of astigmatism, and FIG. 4(c) is a graph of distortion.

FIG. 6(a) is a graph of spherical aberration (graph of longitudinal chromatic aberration), FIG. 6(b) is a graph of astigmatism and FIG. 6(c) is a graph of distortion.

FIG. 8(a) is a graph of spherical aberration (graph of longitudinal chromatic aberration), FIG. 8(b) is a graph of astigmatism and FIG. 8(c) is a graph of distortion.

FIG. 8(a) is a graph of spherical aberration (graph of longitudinal chromatic aberration), FIG. 8(b) is a graph of astigmatism and FIG. 8(c) is a graph of distortion.

DESCRIPTION OF THE INVENTION

Hereinafter, the present invention will be described in more detail by way of embodiments.

Embodiment 1

Figure 1:
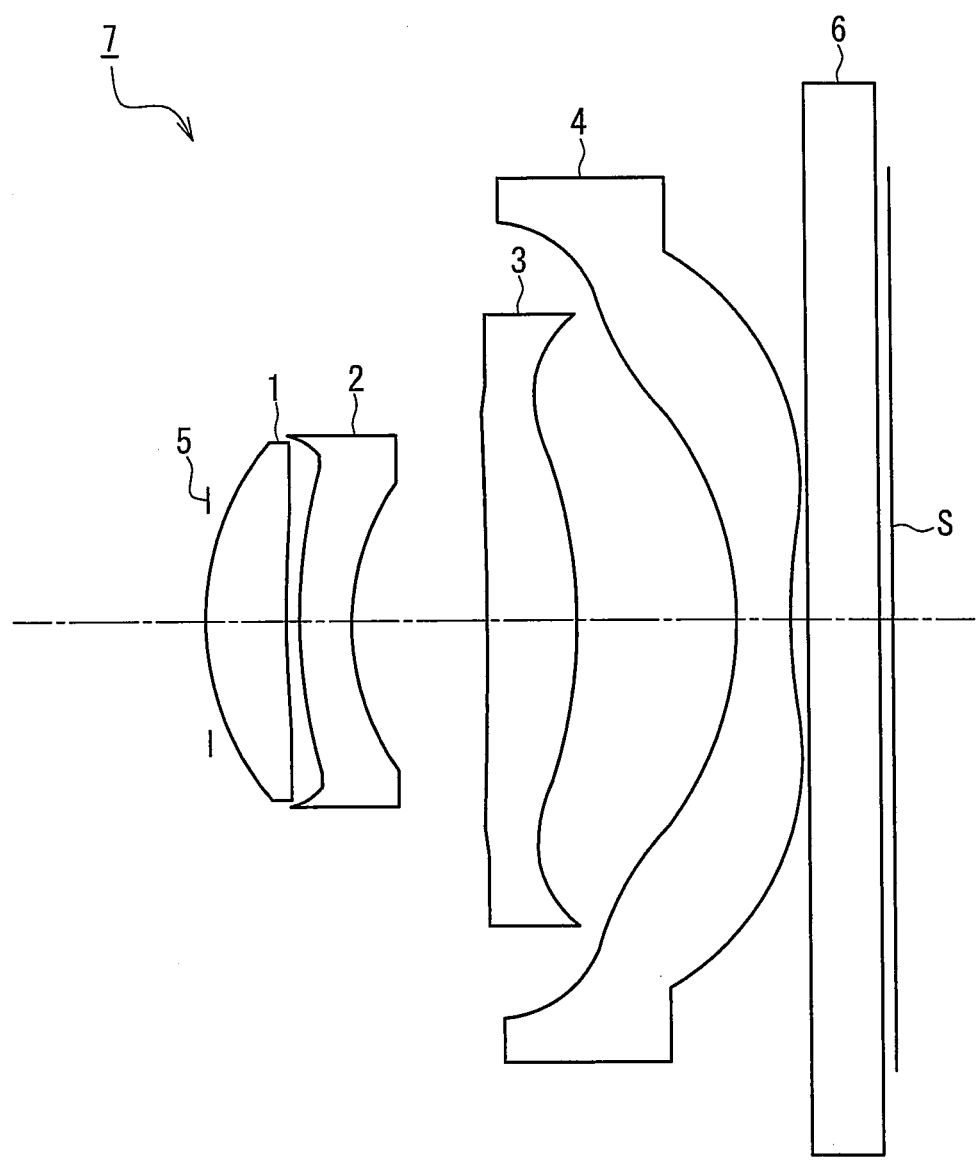
FIG. 1 is a layout drawing showing a configuration of an image pickup lens according to Embodiment 1 of the present invention.

FIG. 1 is a layout drawing showing a configuration of an image pickup lens according to Embodiment 1 of the present invention.

As shown in FIG. 1, the image pickup lens 7 according to the present embodiment includes, in order from the object side (the left side of FIG. 1) to the image surface side (the right side of FIG. 1): an aperture stop 5; a first lens 1 having positive power; a second lens 2 that is a meniscus lens having negative power and whose lens surface facing the image surface side is concave; a third lens 3 that is a meniscus lens having positive power and whose lens surface facing the image surface side is convex; and a fourth lens 4 that has negative power, whose lens surfaces are both aspherical and whose lens surface facing the image surface side is concave near the optical axis. Here, the term power refers to an amount defined by the inverse of the focal length. Further, a diffractive optical element is formed on one of the lens surfaces of the first lens 1 or the second lens 2.

The image pickup lens 7 is an imaging single focus lens for forming an optical image (forming an image of an object) on an image pickup surface S of an image pickup element (e.g., a CCD), and an image pickup element converts an optical signal corresponding to the object into an image signal and outputs the image signal. And as will be described later, an image pickup element and an image pickup lens are used to form an image pickup device, and the image pickup device is used to form a portable device equipped with the image pickup device.

The aspherical shape of each of the lens surfaces can be given by the following formula 1 (the same applies also to Embodiments 2 to 5 described later).

$$X = \frac{\frac{Y^2}{R_0}}{1+\sqrt{1-(\kappa+1)\left(\frac{Y}{R_0}\right)^2}} + $$ [Formula 1]

$$A4Y^4 + A6Y^6 + A8Y^8 + A10Y^{10} + \ldots$$

where Y represents the height from the optical axis, X represents a distance from the tangent plane to the vertex of an aspherical surface of an aspherical shape at height Y from the optical axis, $R_0$ represents the radius of curvature of the apex of the aspherical surface, κ represents a conic constant, and A4, A6, A8, and A10 . . . represent 4th-, 6th-, 8th-, and 10th . . . order aspherical coefficients, respectively.

The shape of the lens surface on which the diffractive optical element is formed (hereinafter referred to as a "diffractive optical element surface") can be given by the following formula 2 (the same applies also to Embodiments 2 to 5 described later).

$$\Phi(\rho) = (2\pi/\lambda_0)(C2\rho^2 + C4\rho^4)$$

$$Y = \rho$$ [Formula 2]

where $\Phi(\rho)$ represents the phase function, Y represents the height from the optical axis, Cn represents n-th order phase coefficient, and $\lambda_0$ represents a design wavelength. Note that X is determined by shape converting $\Phi(\rho)$ at an M-th diffraction order.

According to the configuration of the image pickup lens 7 of the present embodiment, a pair of meniscus lenses with lens surfaces facing each other being concave is used for the second lens 2 and the third lens 3. Thus, it is possible to reduce the angle at which a ray enters the second lens 2 and the third lens 3 to reduce ray aberration. Further, since the diffractive optical element is formed on one of the lens surfaces of the first lens 1 or the second lens 2, chromatic aberration can be corrected favorably. Furthermore, because the lens surfaces of the fourth lens 4 are both aspherical, distortion and field curvature can be corrected favorably.

And for these reasons, according to the configuration of the image pickup lens 7 of the present embodiment, it is possible to provide an image pickup lens composed of four lenses that allows favorable correction of a variety of aberrations and is compatible with small high-pixel image pickup elements (e.g., from CCD and CMOS image sensors having a pixel pitch of 1.75 μm and a pixel count of 5 mega pixels to CCD and CMOS image sensors having a pixel pitch of 1.4 μm and a pixel count of 8 mega pixels) incorporated in small portable devices such as mobile phones. As described above, according to the configuration of the image pickup lens 7 of the present embodiment, the image pickup lens can be made compatible with small high-pixel image pickup elements regardless of the lens material. Thus, it is possible to reduce the cost by using plastic as the lens material.

A transparent parallel plate 6 is disposed between the fourth lens 4 and the image pickup surface S of the image pickup element. Here, the parallel plate 6 is a plate equivalent to an optical low-pass filter, an infrared (IR) cut filter and a faceplate (cover glass) of the image pickup element.

The surfaces from the lens surface of the first lens 1 facing the object side to the surface of the parallel plate 6 facing the image surface side (hereinafter also referred to as "optical surfaces") will be referred to as, in order from the object side, a "first surface", a "second surface", a "third surface", a "fourth surface" . . . an "eighth surface", a "ninth surface", and a "tenth surface", respectively (the same applies also to Embodiments 2 to 5 described later).

In the configuration of the image pickup lens 7 according to the present embodiment, the image pickup lens 7 desirably satisfies the following conditional formula (1).

$$TL/f < 1.31 \quad (1)$$

where f is the focal length of the overall optical system, and TL is the overall length of the optical system (optical overall length).

The conditional expression (1) is an expression representing the compactness (small optical overall length). If the conditional expression (1) is satisfied, a thinned (downsized) image pickup lens that allows further correction of distortion can be provided.

In the configuration of the image pickup lens 7 according to the present embodiment, the first lens 1 is desirably a biconvex lens. If a biconvex lens is used as the first lens 1, positive power can be distributed at each lens surface. Thus, it is possible to provide an image pickup lens that causes less aberration and can be made thinner (downsized).

In the configuration of the image pickup lens 7 according to the present embodiment, at least the first lens 1 or the second lens 2 on which the diffractive optical element is formed is desirably a plastic lens.

The adoption of this desired configuration not only makes molding of the lens including the formation of the diffractive optical element easy but also is advantageous in terms of material costs, and by extension, production costs.

Existing materials such as polymethyl methacyrlate (PMMA), polycarbonate resin (PC), cyclic olefin polymer, polyester resin, styrene resin, polystyrene resin (PS), and low moisture absorbing acrylic resin can be used as the material of the plastic lens. In terms of preventing residual distortion of the lens, polycarbonate resin (PC), cyclic olefin polymer, and polyester resin are preferable.

EXAMPLE 1

Hereinafter, the image pickup lens according to the present embodiment will be described in more detail by way of a specific example.

Table 1 below provides a specific numerical example of an image pickup lens of the present example.

TABLE 1

| Surface number | r (mm) | d (mm) | n | ν |
|---|---|---|---|---|
| Aperture stop | ∞ | 0.000 | — | — |
| 1st surface | 1.661 | 0.545 | 1.53113 | 55.8 |
| 2nd surface* | 23.076 | 0.100 | — | — |
| 3rd surface | 3.248 | 0.350 | 1.607 | 27.59 |
| 4th surface | 1.669 | 0.927 | — | — |
| 5th surface | −172.082 | 0.604 | 1.53113 | 55.8 |
| 6th surface | −2.796 | 1.100 | — | — |
| 7th surface | −2.616 | 0.388 | 1.53113 | 55.8 |
| 8th surface | 3.984 | 0.111 | — | — |
| 9th surface | ∞ | 0.500 | 1.5168 | 64.2 |
| 10th surface | ∞ | 0.050 | — | — |
| Image surface | ∞ | — | — | — |

In Table 1, r (mm) is the radius of curvature of each optical surface, d (mm) is the thickness or distance between each of the pairs of adjacent surfaces of the first lens 1 to the fourth lens 4 and the parallel plate 6 on the optical axis, n is the refractive index of each of the first lens 1 to the fourth lens 4 and the parallel plate 6 at the d line (587.5600 nm), and ν is the Abbe's number of each of the first lens 1 to the fourth lens 4 and the parallel plate 6 at the d line (the same applies also to Examples 2 to 5 described later). Note that the image pickup lens 7 shown in FIG. 1 is configured based on the data provided in Table 1.

Tables 2A and 2B below provide aspherical coefficients (including conic constants) of the image pickup lens of this example. In Tables 2A and 2B, for example, "E+00" and "E−02" represent "$10^{+00}$" and "$10^{-02}$", respectively (the same applies also to Table 3 and Examples 2 to 5 described later).

TABLE 2A

|  | κ | A4 | A6 | A8 |
| --- | --- | --- | --- | --- |
| 1st surface | −3.835990E−01 | 1.256528E−02 | −2.257161E−03 | 2.532202E−03 |
| 2nd surface* | 0.000000E+00 | 1.015556E−02 | −5.271430E−02 | 6.256557E−02 |
| 3rd surface | 0.000000E+00 | −2.151661E−02 | −6.078127E−02 | 7.053659E−02 |
| 4th surface | −1.488844E+00 | 3.324131E−02 | −1.746148E−02 | 3.426944E−02 |
| 5th surface | 1.340455E+04 | −5.826808E−03 | 5.395891E−04 | −2.029325E−03 |
| 6th surface | −6.977746E+00 | −2.331346E−02 | 9.666667E−03 | −2.208196E−03 |
| 7th surface | 0.000000E+00 | −6.151879E−02 | 1.760126E−02 | 2.019762E−05 |
| 8th surface | −1.515303E+01 | −6.085262E−02 | 7.296019E−03 | −1.374285E−03 |

TABLE 2B

|  | A10 | A12 | A14 |
| --- | --- | --- | --- |
| 1st surface | −6.682674E−03 | 3.245110E−02 | −2.243557E−02 |
| 2nd surface* | 3.830157E−02 | −4.035339E−02 | −9.609272E−03 |
| 3rd surface | 6.824462E−02 | −6.878876E−02 | −1.063963E−02 |
| 4th surface | 4.835814E−02 | −2.076535E−02 | −1.695685E−02 |
| 5th surface | 2.210879E−04 | 3.850253E−04 | 7.252002E−05 |
| 6th surface | 2.306356E−03 | −2.678594E−04 | −2.928607E−05 |
| 7th surface | −1.296610E−04 | 7.466119E−06 | −1.802590E−06 |
| 8th surface | 2.607752E−04 | −1.764292E−05 | −1.084897E−06 |

As can be seen from Tables 2A and 2B, in the image pickup lens 7 of this example, the lens surfaces of the first lens 1 to the fourth lens 4 are all aspherical. It should be noted, however, that the image pickup lens 7 is not particularly limited to such a configuration as long as the lens surfaces of the fourth lens 4 are both aspherical.

In Tables 1, 2A and 2B, the surface marked with an asterisk (the second surface: the surface of the first lens 1 facing the image surface side) is a diffractive optical element surface and a specific numerical example of the diffractive optical element surface is provided in Table 3 below.

TABLE 3

| Design wavelength | 546.07 nm |
| --- | --- |
| Diffraction order | 1 |
| C2 | −5.129320E−03 |
| C4 | 6.461326E−04 |

In this way, in the image pickup lens 7 of this example, the diffractive optical element is formed on the lens surface of the first lens 1 facing the image surface side but the image pickup lens 7 does not have to be configured as such. The same effect can be achieved even if the diffractive optical element is formed on the lens surface of the first lens 1 facing the object side or on the lens surface of the second lens 2 facing the object side or the image surface side.

Table 4 below provides the F number Fno, the focal length f (mm) of the overall optical system, the overall optical length TL (mm) measured in terms of air, the maximum image height Y' and the value of the conditional expression (1) associated with the image pickup lens 7 of this example.

TABLE 4

| Fno | 2.91 |
| --- | --- |
| f (mm) | 4.25 |
| TL (in terms of air) (mm) | 4.675 |
| Y' | 2.835 |
| Conditional expression (1) TL/f | 1.1 |

Figure 2:
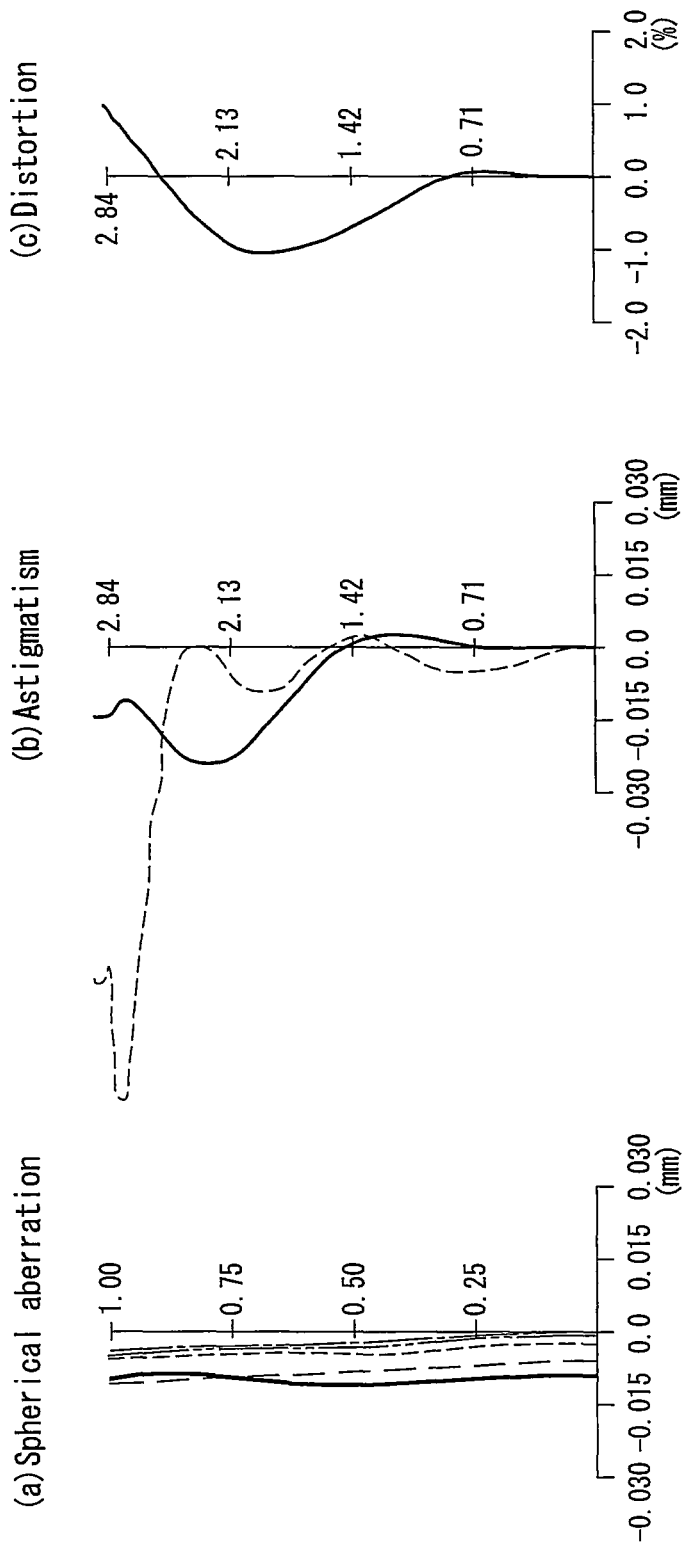
FIG. 2 shows graphs of aberrations associated with an image pickup lens of Example 1 of the present invention.

FIG. 2 shows graphs of aberrations associated with the image pickup lens of this example. FIG. 2(a) is a graph of spherical aberration. In FIG. 2(a), a solid line indicates values at the g line (435.8300 nm), a long dashed line indicates values at the C line (656.2700 nm), a short dashed line indicates values at the F line (486.1300 nm), a double chain line indicates values at the d line (587.5600 nm), a chain line indicates values at the e line (546.0700 nm). FIG. 2(b) is a graph of astigmatism. In FIG. 2(b), a solid line indicates a sagittal field curvature and a dashed line indicates a meridional field curvature. FIG. 2(c) is a graph of distortion. Note that longitudinal chromatic aberration can be read from the graph of spherical aberration in FIG. 2(a).

As can be seen from the graphs of aberration in FIG. 2, the image pickup lens 7 of this example allows favorable correction of a variety of aberrations and is compatible with small high-pixel image pickup elements (e.g., from CCD and CMOS image sensors having a pixel pitch of 1.75 μm and a pixel count of 5 mega pixels to CCD and CMOS image sensors having a pixel pitch of 1.4 μm and a pixel count of 8 mega pixels) incorporated in small portable devices such as mobile phones. Additionally, in view of the results provided in Table 4 above, it is clear that a bright and compact (small, thin) image pickup lens is obtained.

Embodiment 2

Figure 3:
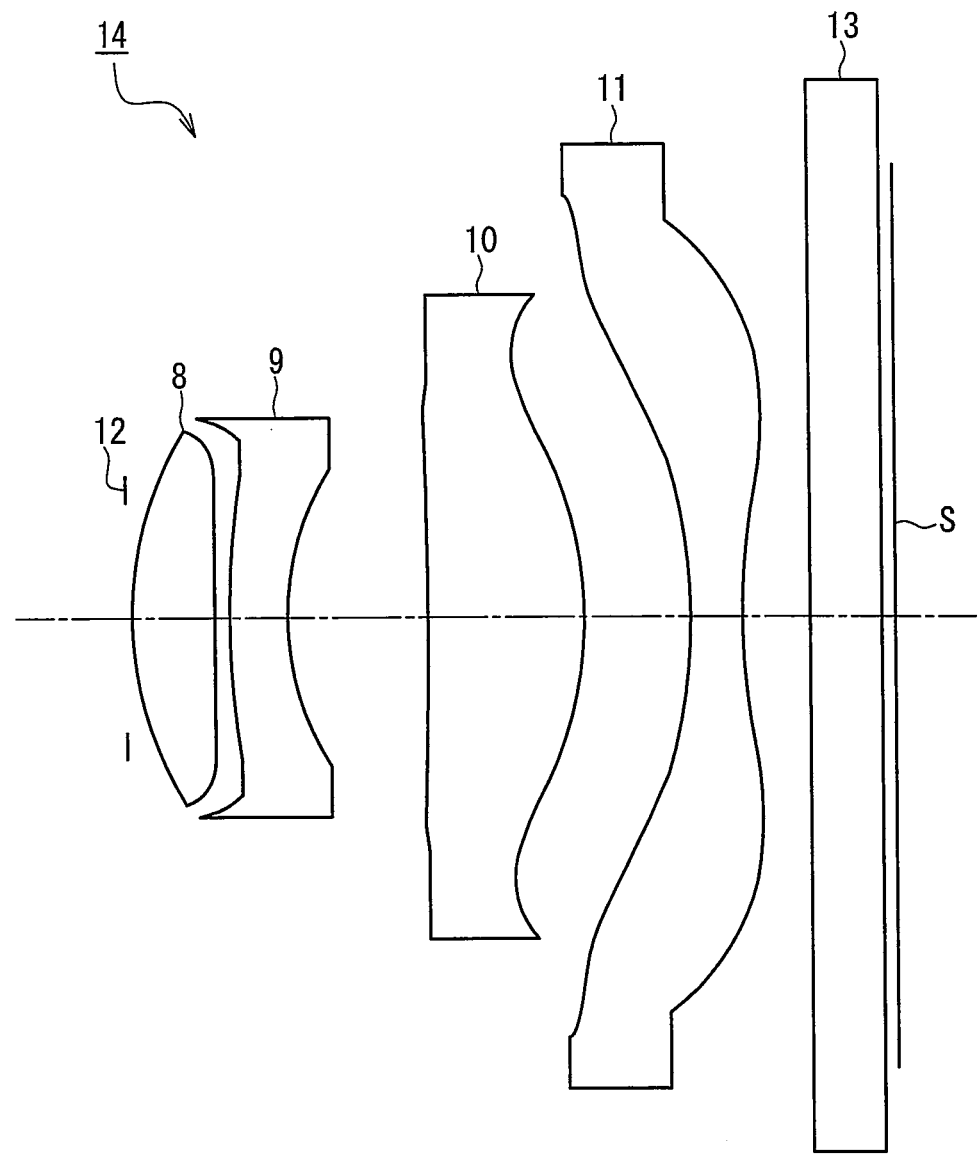
FIG. 3 is a layout drawing showing a configuration of an image pickup lens according to Embodiment 2 of the present invention.

FIG. 3 is a layout drawing showing a configuration of an image pickup lens according to Embodiment 2 of the present invention.

As shown in FIG. 3, the image pickup lens 14 according to the present embodiment includes, in order from the object side (the left side of FIG. 3) to the image surface side (the right side of FIG. 3): an aperture stop 12; a first lens 8 having positive power; a second lens 9 that is a meniscus lens having negative power and whose lens surface facing the image surface side is concave; a third lens 10 that is a meniscus lens having positive power and whose lens surface facing the image surface side is convex; and a fourth lens 11 that has negative power, whose lens surfaces are both aspherical and whose lens surface facing the image surface side is concave near the optical axis. Further, a diffractive optical element is formed on one of the lens surfaces of the first lens 8 or the second lens 9.

A transparent parallel plate 13 similar to the parallel plate 6 in Embodiment 1 is disposed between the fourth lens 11 and the image pickup surface S of the image pickup element.

Also in the configuration of the image pickup lens 14 according to the present embodiment, the image pickup lens 14 desirably satisfies the conditional expression (1) mentioned above.

Further, also in the configuration of the image pickup lens 14 according to the present embodiment, the first lens 8 is desirably a biconvex lens.

Further, also in the configuration of the image pickup lens 14 according to the present embodiment, at least the first lens 8 or the second lens 9 on which the diffractive optical element is formed is desirably a plastic lens.

And even from the configuration of the image pickup lens 14 according to the present embodiment, the same effects as those obtained from the configuration of the image pickup lens 7 according to Embodiment 1 can be obtained.

EXAMPLE 2

Hereinafter, the image pickup lens according to the present embodiment will be described in more detail by way of a specific example.

Table 5 below provides a specific numerical example of the image pickup lens of this example. Note that the image pickup lens 14 shown in FIG. 3 is configured based on the data provided in Table 5.

TABLE 5

| Surface number | r (mm) | d (mm) | n | ν |
|---|---|---|---|---|
| Aperture stop | ∞ | 0.000 | — | — |
| 1st surface | 1.850 | 0.548 | 1.53113 | 55.8 |
| 2nd surface* | −31.812 | 0.100 | — | — |
| 3rd surface | 3.890 | 0.388 | 1.607 | 27.59 |
| 4th surface | 1.719 | 0.922 | — | — |
| 5th surface | −64.542 | 1.046 | 1.53113 | 55.8 |
| 6th surface | −1.822 | 0.700 | — | — |
| 7th surface | −4.318 | 0.350 | 1.53113 | 55.8 |
| 8th surface | 2.504 | 0.435 | — | — |
| 9th surface | ∞ | 0.500 | 1.5168 | 64.2 |
| 10th surface | ∞ | 0.050 | — | — |
| Image surface | ∞ | — | — | — |

Tables 6A and 6B below provide aspherical coefficients (including conic constants) of the image pickup lens of this example.

TABLE 6A

| | κ | A4 | A6 | A8 |
|---|---|---|---|---|
| 1st surface | −4.608154E−01 | 1.030298E−02 | −4.479538E−03 | 6.375463E−04 |
| 2nd surface* | −4.725075E+01 | 1.351237E−02 | −6.251489E−02 | 5.825343E−02 |
| 3rd surface | 0.000000E+00 | −2.458998E−02 | −6.320703E−02 | 6.413006E−02 |
| 4th surface | −1.953135E+00 | 2.398750E−02 | −2.072448E−02 | 2.498276E−02 |
| 5th surface | −3.019753E+01 | −2.867335E−03 | 1.556527E−03 | −1.511765E−03 |
| 6th surface | −3.902465E+00 | −2.024609E−02 | 8.904531E−03 | −3.148966E−03 |
| 7th surface | 0.000000E+00 | −6.187455E−02 | 1.615501E−02 | −2.556963E−04 |
| 8th surface | −1.087798E+01 | −4.607647E−02 | 8.045167E−03 | −1.719407E−03 |

TABLE 6B

| | A10 | A12 | A14 |
|---|---|---|---|
| 1st surface | −7.714657E−03 | 3.052643E−02 | −2.257328E−02 |
| 2nd surface* | 4.110212E−02 | −3.802001E−02 | −1.709984E−02 |
| 3rd surface | 6.659626E−02 | −6.536871E−02 | −7.140583E−03 |
| 4th surface | 3.640419E−02 | −2.192394E−02 | −5.764063E−03 |
| 5th surface | 2.084730E−04 | 2.703016E−04 | −9.186031E−06 |
| 6th surface | 2.103926E−03 | −2.639683E−04 | −9.578690E−06 |
| 7th surface | −1.634418E−04 | 7.035871E−06 | 2.628160E−08 |
| 8th surface | 2.233170E−04 | −1.218059E−05 | −2.008787E−07 |

As can be seen from Tables 6A and 6B, in the image pickup lens 14 of this example, the lens surfaces of the first lens 8 to the fourth lens 11 are all aspherical. It should be noted, however, that the image pickup lens 14 is not particularly limited to such a configuration as long as the lens surfaces of the fourth lens 11 are both aspherical.

In Tables 5, 6A and 6B, the surface marked with an asterisk (the second surface: the surface of the first lens 8 facing the image surface side) is a diffractive optical element surface, and a specific numerical example of the diffractive optical element surface is provided in Table 7 below.

TABLE 7

| Design wavelength | 546.07 nm |
|---|---|
| Diffraction order | 1 |
| C2 | −4.322202E−03 |
| C4 | 1.138711E−03 |

In this way, in the image pickup lens 14 of this example, the diffractive optical element is formed on the lens surface of the first lens 8 facing the image surface side but the image pickup lens 14 does not have to be configured as such. The same effect can be achieved even if the diffractive optical element is formed on the lens surface of the first lens 8 facing the object side or on the lens surface of the second lens 9 facing the object side or the image surface side.

Table 8 below provides the F number Fno, the focal length f (mm) of the overall optical system, the overall optical length TL (mm) measured in terms of air, the maximum image height Y' and the value of the conditional expression (1) associated with the image pickup lens 14 of this example.

TABLE 8

| Fno | 2.87 |
|---|---|
| f (mm) | 4.19 |
| TL (in terms of air) (mm) | 5.04 |
| Y' | 2.835 |
| Conditional expression (1) TL/f | 1.20 |

Figure 4:
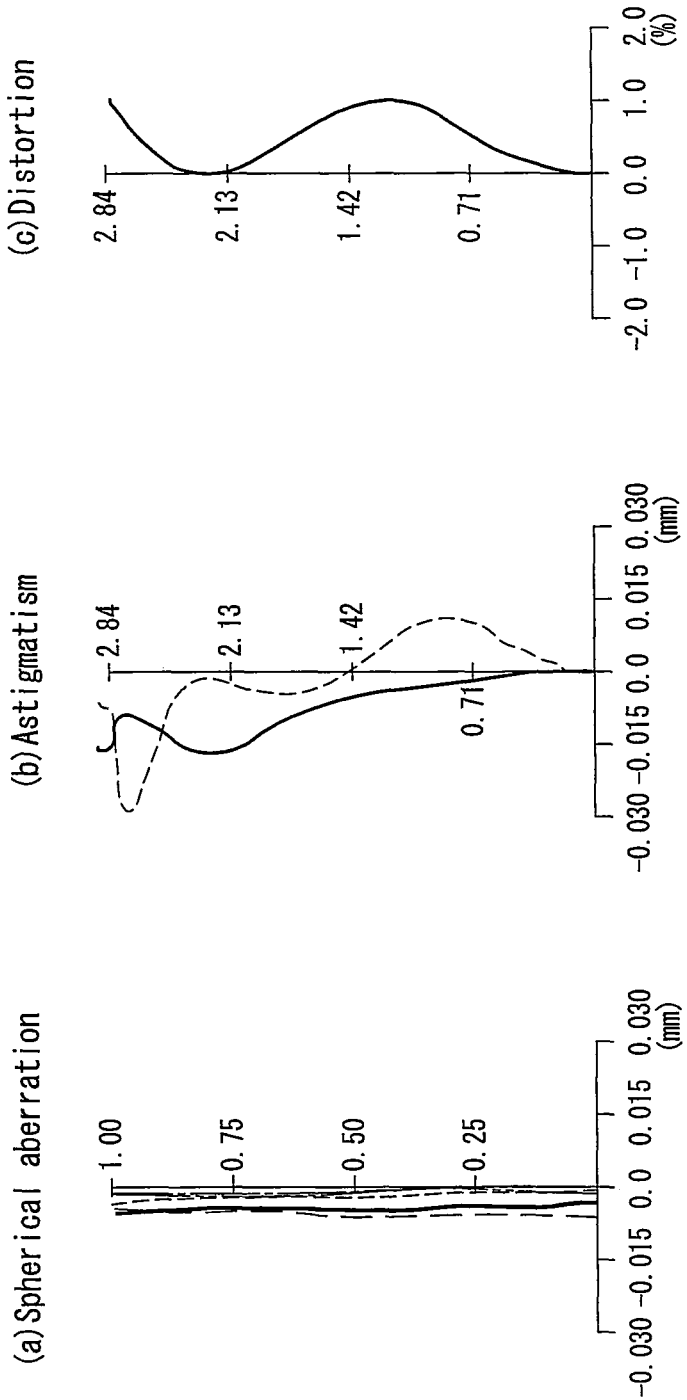
FIG. 4 shows graphs of aberrations associated with an image pickup lens of Example 2 of the present invention.

FIG. 4 shows graphs of aberrations associated with the image pickup lens of this example. FIG. 4(a) is a graph of spherical aberration. In FIG. 4(a), a solid line indicates values at the g line, a short dashed line indicates values at the F line, a chain line indicates values at the e line, a double chain line indicates values at the d line, and a long dashed line indicates values at the C line. FIG. 4(b) is a graph of astigmatism. In FIG. 4(b), a solid line indicates a sagittal field curvature and a dashed line indicates a meridional field curvature. FIG. 4(c) is a graph of distortion. Note that longitudinal chromatic aberration can be read from the graph of spherical aberration in FIG. 4(a).

As can be seen from the graphs of aberration in FIG. 4, the image pickup lens 14 of this example allows favorable correction of a variety of aberrations and is compatible with small high-pixel image pickup elements (e.g., from CCD and CMOS image sensors having a pixel pitch of 1.75 μm and a pixel count of 5 mega pixels to CCD and CMOS image sensors having a pixel pitch of 1.4 μm and a pixel count of 8 mega pixels) incorporated in small portable devices such as mobile phones. Additionally, in view of the results provided in Table 8 above, it is clear that a bright and compact (small, thin) image pickup lens is obtained.

Embodiment 3

Figure 5:
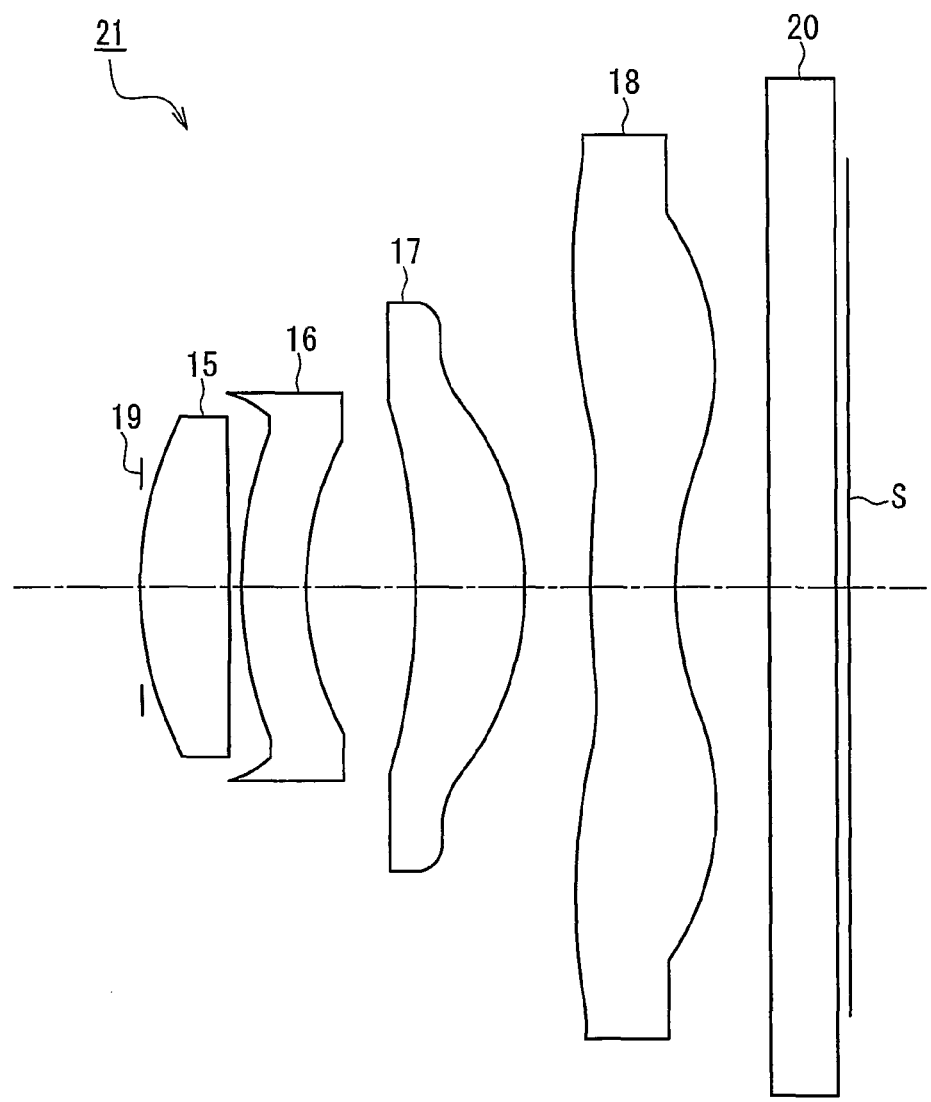
FIG. 5 is a layout drawing showing a configuration of an image pickup lens according to Embodiment 3 of the present invention.

FIG. 5 is a layout drawing showing a configuration of an image pickup lens according to Embodiment 3 of the present invention.

As shown in FIG. 5, the image pickup lens 21 according to the present embodiment includes, in order from the object side (the left side of FIG. 5) to the image surface side (the right side of FIG. 5): an aperture stop 19; a first lens 15 having positive power; a second lens 16 that is a meniscus lens having negative power and whose lens surface facing the image surface side is concave; a third lens 17 that is a meniscus lens having positive power and whose lens surface facing the image surface side is convex; and a fourth lens 18 that has negative power, whose lens surfaces are both aspherical and whose lens surface facing the image surface side is concave near the optical axis. Further, a diffractive optical element is formed on one of the lens surfaces of the first lens 15 or the second lens 16.

A transparent parallel plate 20 similar to the parallel plate 6 in Embodiment 1 is disposed between the fourth lens 18 and the image pickup surface S of the image pickup element.

Also in the configuration of the image pickup lens 21 according to the present embodiment, the image pickup lens 21 desirably satisfies the conditional expression (1) mentioned above.

Further, also in the configuration of the image pickup lens 21 according to the present embodiment, the first lens 15 is desirably a biconvex lens.

Further, also in the configuration of the image pickup lens 21 according to the present embodiment, at least the first lens 15 or the second lens 16 on which the diffractive optical element is formed is desirably a plastic lens.

And even from the configuration of the image pickup lens 21 according to the present embodiment, the same effects as those obtained from the configuration of the image pickup lens 7 according to Embodiment 1 can be obtained.

EXAMPLE 3

Hereinafter, the image pickup lens according to the present embodiment will be described in more detail by way of a specific example.

Table 9 below provides a specific numerical example of the image pickup lens of this example. Note that the image pickup lens 21 shown in FIG. 5 is configured based on the data provided in Table 9.

TABLE 9

| Surface number | r (mm) | d (mm) | n | ν |
|---|---|---|---|---|
| Aperture stop | ∞ | 0.000 | — | — |
| 1st surface | 1.708 | 0.484 | 1.53113 | 55.8 |
| 2nd surface | −37.421 | 0.100 | — | — |
| 3rd surface* | 2.726 | 0.335 | 1.607 | 27.59 |
| 4th surface | 1.493 | 0.640 | — | — |
| 5th surface | −3.859 | 0.623 | 1.53113 | 55.8 |
| 6th surface | −1.226 | 0.374 | — | — |
| 7th surface | 3.487 | 0.469 | 1.53113 | 55.8 |
| 8th surface | 1.127 | 0.505 | — | — |
| 9th surface | ∞ | 0.500 | 1.5168 | 64.2 |
| 10th surface | ∞ | 0.050 | — | — |
| Image surface | ∞ | — | — | — |

Tables 10A and 10B below provide aspherical coefficients (including conic constants) of the image pickup lens of this example.

TABLE 10A

|  | κ | A4 | A6 | A8 |
|---|---|---|---|---|
| 1st surface | −1.261900E−01 | −4.246192E−03 | −2.536003E−03 | 3.428554E−02 |
| 2nd surface | 2.479300E+03 | 3.844736E−02 | −1.498137E−02 | 1.864487E−01 |
| 3rd surface* | −1.802726E+00 | 1.894560E−02 | −6.707071E−02 | 2.469308E−01 |
| 4th surface | −8.118938E−01 | 3.410890E−02 | −6.773099E−02 | 6.751520E−02 |
| 5th surface | −3.706628E+01 | −4.994049E−02 | −9.365243E−03 | 4.247712E−02 |
| 6th surface | −2.866857E+00 | −6.574705E−02 | 4.602873E−02 | −4.515028E−02 |
| 7th surface | −5.349633E+01 | −1.375236E−01 | 5.108674E−02 | −2.935753E−03 |
| 8th surface | −5.370605E+00 | −1.088572E−01 | 4.342817E−02 | −1.428086E−02 |

TABLE 10B

|  | A10 | A12 | A14 | A16 |
|---|---|---|---|---|
| 1st surface | 6.024591E−02 | −1.595411E−01 | −1.242687E−04 | −1.958825E−04 |
| 2nd surface | 1.528133E−01 | −4.570950E−01 | −3.457616E−04 | −2.170559E−05 |
| 3rd surface* | 1.029031E−01 | −3.213336E−01 | −5.757518E−02 | −2.728640E−02 |
| 4th surface | 2.238924E−01 | −1.484286E−01 | 3.420919E−02 | −2.007409E−01 |
| 5th surface | −5.000036E−02 | 1.146947E−02 | 8.103217E−03 | 3.071397E−03 |
| 6th surface | 3.801388E−02 | −5.550449E−03 | 1.234833E−04 | −6.823510E−04 |
| 7th surface | −1.403814E−03 | 2.157411E−04 | 1.875865E−06 | −1.353096E−06 |
| 8th surface | 2.539762E−03 | −1.935096E−04 | 4.099155E−06 | −2.117909E−07 |

As can be seen from Tables 10A and 10B, in the image pickup lens 21 of this example, the lens surfaces of the first lens 15 to the fourth lens 18 are all aspherical. It should be noted, however, that the image pickup lens 21 is not particularly limited to such a configuration as long as the lens surfaces of the fourth lens 18 are both aspherical.

In Tables 9, 10A and 10B, the surface marked with an asterisk (the third surface: the surface of the second lens 16 facing the object side) is a diffractive optical element surface, and a specific numerical example of the diffractive optical element surface is provided in Table 11 below.

TABLE 11

| Design wavelength | 546.07 nm |
|---|---|
| Diffraction order | 1 |
| C2 | −8.036850E−03 |
| C4 | 2.248777E−04 |

In this way, in the image pickup lens 21 of this example, the diffractive optical element is formed on the lens surface of the second lens 16 facing the object side but the image pickup lens 21 does not have to be configured as such. The same effect can be achieved even if the diffractive optical element is formed on the lens surface of the first lens 15 facing the object side or on the image surface side or the lens surface of the second lens 16 facing the image surface side.

Table 12 below provides the F number Fno, the focal length f (mm) of the overall optical system, the overall optical length TL (mm) measured in terms of air, the maximum image height Y' and the value of the conditional expression (1) associated with the image pickup lens 21 of this example.

TABLE 12

| Fno | 2.8 |
|---|---|
| f (mm) | 3.2 |
| TL (in terms of air) (mm) | 4.08 |
| Y' | 2.268 |
| Conditional expression (1) TL/f | 1.275 |

Figure 6:
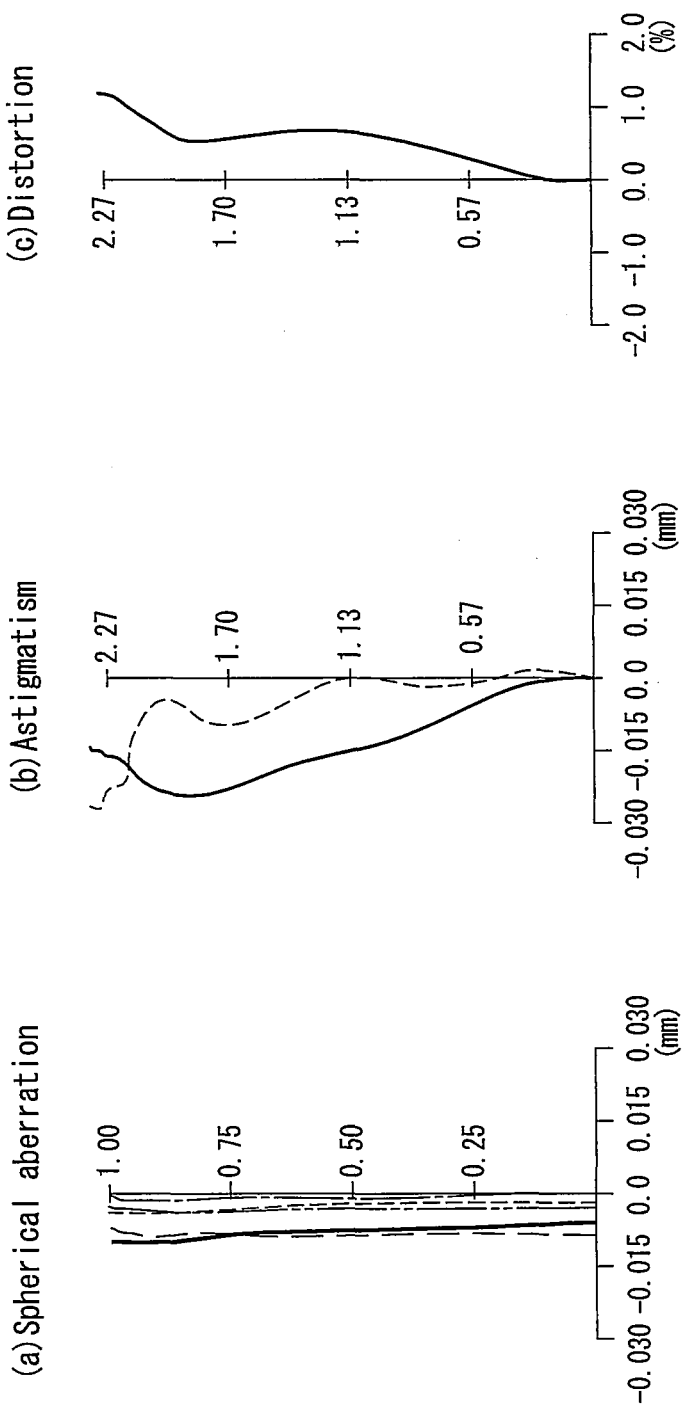
FIG. 6 shows graphs of aberrations associated with an image pickup lens of Example 3 of the present invention.

FIG. 6 shows graphs of aberrations associated with the image pickup lens of this example. FIG. 6(a) is a graph of spherical aberration. In FIG. 6(a), a solid line indicates values at the g line, a short dashed line indicates values at the F line, a chain line indicates values at the e line, a double chain line indicates values at the d line, and a long dashed line indicates values at the C line. FIG. 6(b) is a graph of astigmatism. In FIG. 6(b), a solid line indicates a sagittal field curvature and a dashed line indicates a meridional field curvature. FIG. 6(c) is a graph of distortion. Note that longitudinal chromatic aberration can be read from the graph of spherical aberration in FIG. 6(a).

As can be seen from the graphs of aberration in FIG. 6, the image pickup lens 21 of this example allows favorable correction of a variety of aberrations and is compatible with small high-pixel image pickup elements (e.g., from CCD and CMOS image sensors having a pixel pitch of 1.75 μm and a pixel count of 5 mega pixels to CCD and CMOS image sensors having a pixel pitch of 1.4 μm and a pixel count of 8 mega pixels) incorporated in small portable devices such as mobile phones. Additionally, in view of the results provided in Table 12 above, it is clear that a bright and compact (small, thin) image pickup lens is obtained.

Embodiment 4

Figure 7:
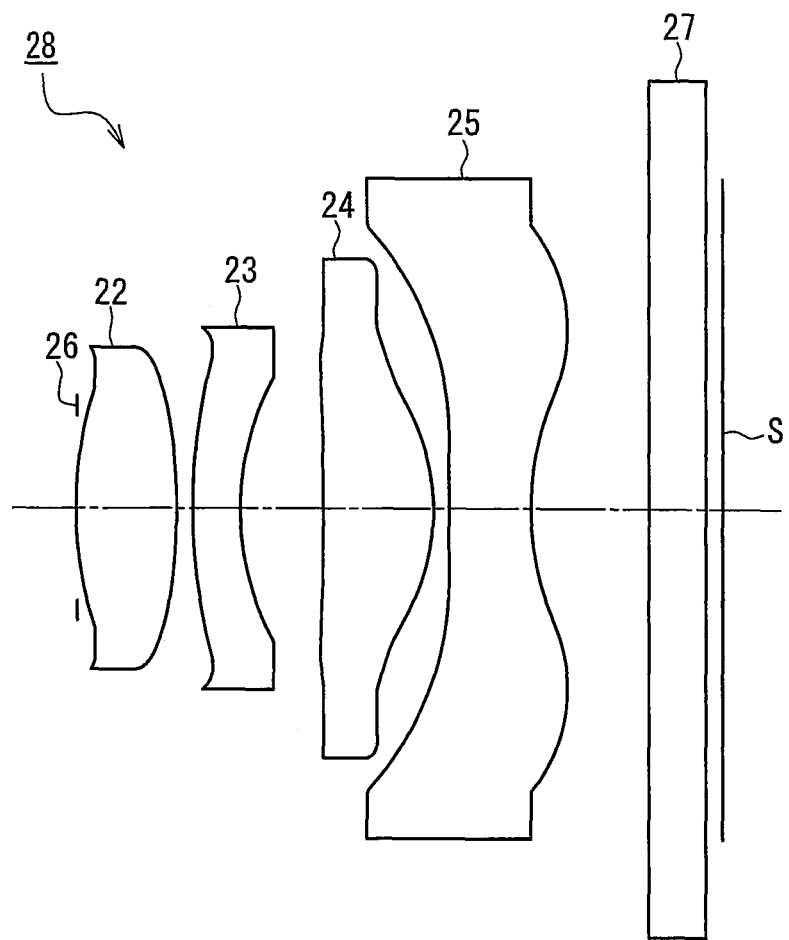
FIG. 7 is a layout drawing showing a configuration of an image pickup lens according to Embodiment 4 of the present invention.

FIG. 7 is a layout drawing showing a configuration of an image pickup lens according to Embodiment 4 of the present invention.

As shown in FIG. 7, the image pickup lens 28 according to the present embodiment includes, in order from the object side (the left side of FIG. 7) to the image surface side (the right side of FIG. 7): an aperture stop 26; a first lens 22 having positive power; a second lens 23 that is a meniscus lens having negative power and whose lens surface facing the image surface side is concave; a third lens 24 that is a meniscus lens having positive power and whose lens surface facing the image surface side is convex; and a fourth lens 25 that has negative power, whose lens surfaces are both aspherical and whose lens surface facing the image surface side is concave near the optical axis. Further, a diffractive optical element is formed on one of the lens surfaces of the first lens 22 or the second lens 23.

A transparent parallel plate 27 similar to the parallel plate 6 in Embodiment 1 is disposed between the fourth lens 25 and the image pickup surface S of the image pickup element.

Also in the configuration of the image pickup lens 28 according to the present embodiment, the image pickup lens 28 desirably satisfies the conditional expression (1) mentioned above.

Further, also in the configuration of the image pickup lens 28 according to the present embodiment, the first lens 22 is desirably a biconvex lens.

Further, also in the configuration of the image pickup lens 28 according to the present embodiment, at least the first lens 22 or the second lens 23 on which the diffractive optical element is formed is desirably a plastic lens.

And even from the configuration of the image pickup lens 28 according to the present embodiment, the same effects as those obtained from the configuration of the image pickup lens 7 according to Embodiment 1 can be obtained.

EXAMPLE 4

Hereinafter, the image pickup lens according to the present embodiment will be described in more detail by way of a specific example.

Table 13 below provides a specific numerical example of the image pickup lens of this example. Note that the image pickup lens 28 shown in FIG. 7 is configured based on the data provided in Table 13.

TABLE 13

| Surface number | r (mm) | d (mm) | n | ν |
|---|---|---|---|---|
| Aperture stop | ∞ | 0.000 | — | — |
| 1st surface | 2.169 | 0.618 | 1.53113 | 55.8 |
| 2nd surface* | −3.877 | 0.108 | — | — |
| 3rd surface | 3.155 | 0.302 | 1.607 | 27.59 |
| 4th surface | 1.435 | 0.534 | — | — |
| 5th surface | −6.597 | 0.672 | 1.53113 | 55.8 |
| 6th surface | −1.082 | 0.116 | — | — |
| 7th surface | 4.723 | 0.521 | 1.53113 | 55.8 |
| 8th surface | 0.963 | 0.676 | — | — |
| 9th surface | ∞ | 0.500 | 1.5168 | 64.2 |
| 10th surface | ∞ | 0.050 | — | — |
| Image surface | ∞ | — | — | — |

Tables 14A and 14B below provide aspherical coefficients (including conic constants) of the image pickup lens of this example.

TABLE 14A

|  | κ | A4 | A6 | A8 |
|---|---|---|---|---|
| 1st surface | −2.437202E+00 | −2.254704E−02 | −5.902011E−02 | 4.271027E−02 |
| 2nd surface* | 0.000000E+00 | −4.893904E−02 | 2.258591E−02 | −3.190718E−03 |
| 3rd surface | −3.119677E+00 | −5.941885E−02 | 6.342852E−02 | 1.477468E−01 |
| 4th surface | −2.401800E+00 | 2.208022E−02 | 3.793762E−04 | 8.184042E−02 |
| 5th surface | −3.406508E+01 | 7.285610E−02 | −3.527527E−02 | 8.396794E−03 |
| 6th surface | −4.661195E+00 | −8.945022E−02 | 6.931338E−02 | −1.306240E−03 |
| 7th surface | −3.925109E+01 | −2.105378E−01 | 2.304597E−02 | 5.330480E−02 |
| 8th surface | −5.560141E+00 | −1.385503E−01 | 5.656882E−02 | −2.099597E−02 |

TABLE 14B

|  | A10 | A12 |
|---|---|---|
| 1st surface | −1.399463E−01 | 0.000000E+00 |
| 2nd surface* | −1.393199E−01 | 0.000000E+00 |
| 3rd surface | −1.635945E−01 | −1.748539E−02 |
| 4th surface | 4.347091E−02 | −9.881719E−02 |
| 5th surface | 8.952470E−03 | −3.309625E−03 |
| 6th surface | 1.245177E−02 | −6.882913E−03 |
| 7th surface | −2.951132E−02 | 4.705947E−03 |
| 8th surface | 4.641824E−03 | −5.195757E−04 |

As can be seen from Tables 14A and 14B, in the image pickup lens 28 of this example, the lens surfaces of the first lens 22 to the fourth lens 25 are all aspherical. It should be noted, however, that the image pickup lens 28 is not particularly limited to such a configuration as long as the lens surfaces of the fourth lens 25 are both aspherical.

In Tables 13, 14A and 14B, the surface marked with an asterisk (the second surface: the surface of the first lens 22 facing the image surface side) is a diffractive optical element surface, and a specific numerical example of the diffractive optical element surface is provided in Table 15 below.

TABLE 15

| Design wavelength | 546.07 nm |
|---|---|
| Diffraction order | 1 |
| C2 | −5.938180E−03 |
| C4 | 9.700981E−04 |

In this way, in the image pickup lens 28 of this example, the diffractive optical element is formed on the lens surface of the first lens 22 facing the image surface side but the image pickup lens 28 does not have to be configured as such. The same effect can be achieved even if the diffractive optical element is formed on the lens surface of the first lens 22 facing the object side or on the lens surface of the second lens 23 facing the object side or the image surface side.

Table 16 below provides the F number Fno, the focal length f (mm) of the overall optical system, the overall optical length TL (mm) measured in terms of air, the maximum image height Y' and the value of the conditional expression (1) associated with the image pickup lens 28 of this example.

TABLE 16

| Fno | 2.8 |
|---|---|
| f (mm) | 3.12 |
| TL (in terms of air) (mm) | 4.096 |
| Y' | 2.36 |
| Conditional expression (1) TL/f | 1.31 |

Figure 8:
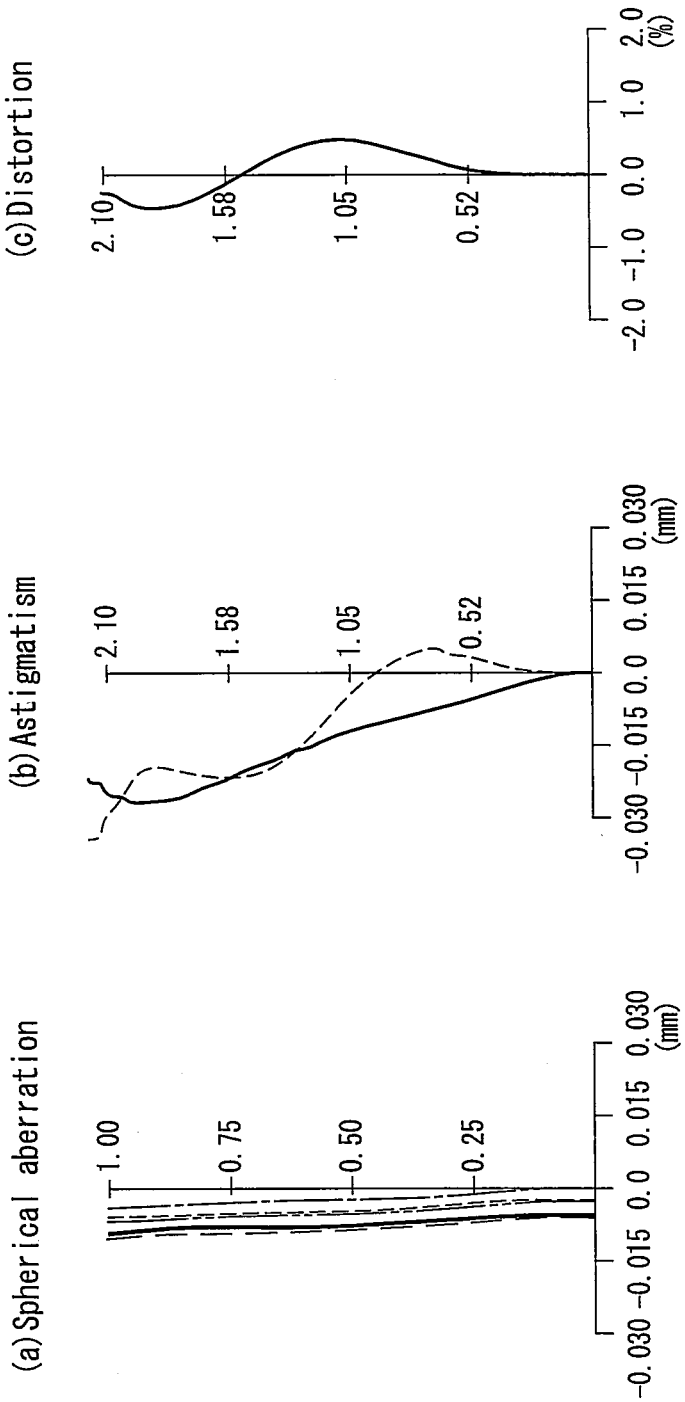
FIG. 8 shows graphs of aberrations associated with an image pickup lens of Example 4 of the present invention.

FIG. 8 shows graphs of aberrations associated with the image pickup lens of this example. FIG. 8(*a*) is a graph of spherical aberration. In FIG. 8(*a*), a solid line indicates values at the g line, a short dashed line indicates values at the F line, a chain line indicates values at the e line, a double chain line indicates values at the d line, and a long dashed line indicates values at the C line. FIG. 8(*b*) is a graph of astigmatism. In FIG. 8(*b*), a solid line indicates a sagittal field curvature and a dashed line indicates a meridional field curvature. FIG. 8(*c*) is a graph of distortion. Note that longitudinal chromatic aberration can be read from the graph of spherical aberration in FIG. 8(*a*).

As can be seen from the graphs of aberration in FIG. 8, the image pickup lens 28 of this example allows favorable correction of a variety of aberrations and is compatible with small high-pixel image pickup elements (e.g., from CCD and CMOS image sensors having a pixel pitch of 1.75 μm and a pixel count of 5 mega pixels to CCD and CMOS image sensors having a pixel pitch of 1.4 μm and a pixel count of 8 mega pixels) incorporated in small portable devices such as mobile phones. Additionally, in view of the results provided in Table 16 above, it is clear that a bright and compact (small, thin) image pickup lens is obtained.

Embodiment 5

Figure 9:
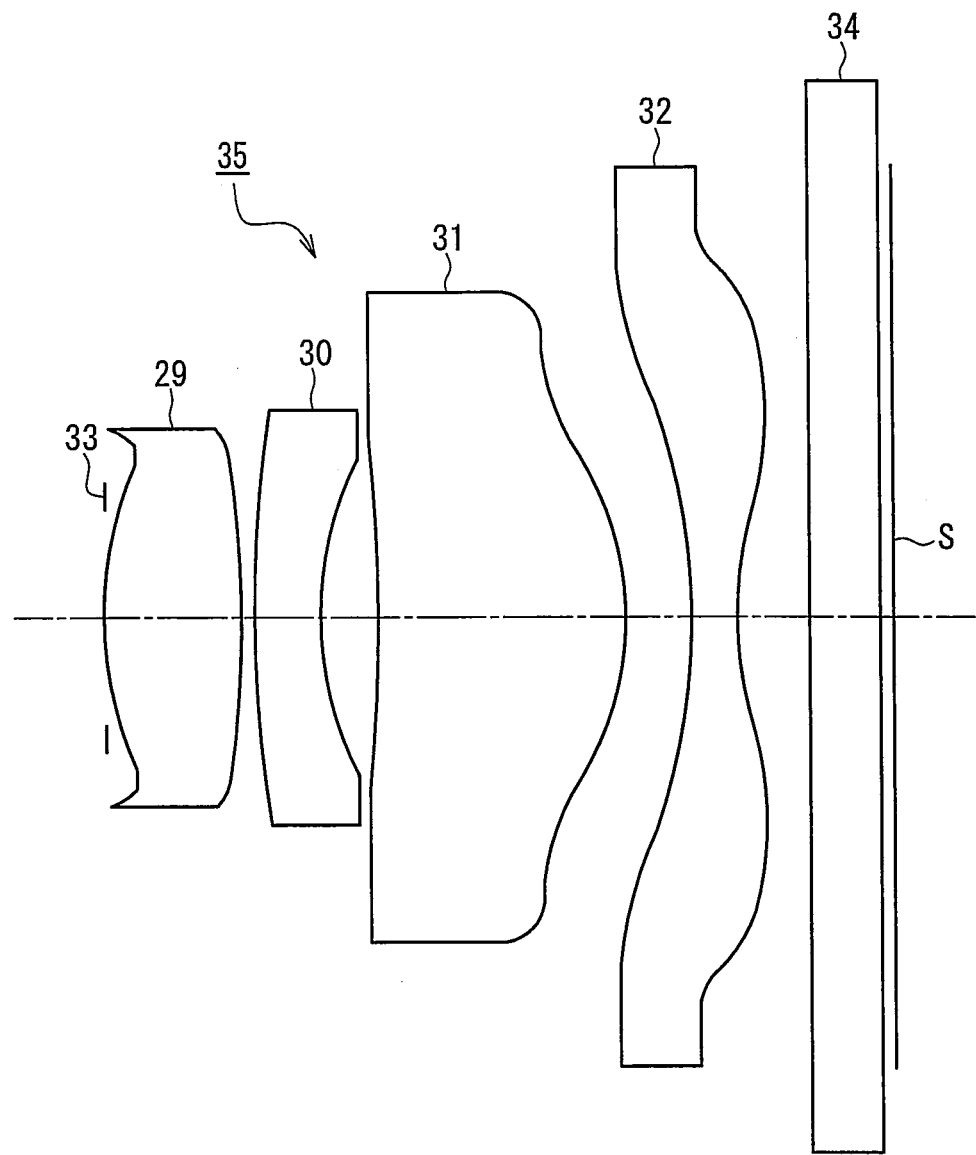
FIG. 9 is a layout drawing showing a configuration of an image pickup lens according to Embodiment 5 of the present invention.

FIG. 9 is a layout drawing showing a configuration of an image pickup lens according to Embodiment 5 of the present invention.

As shown in FIG. 9, the image pickup lens 35 according to the present embodiment includes, in order from the object side (the left side of FIG. 9) to the image surface side (the right side of FIG. 9): an aperture stop 33; a first lens 29 having positive power; a second lens 30 that is a meniscus lens having negative power and whose lens surface facing the image surface side is concave; a third lens 31 that is a meniscus lens having positive power and whose lens surface facing the image surface side is convex; and a fourth lens 32 that has negative power, whose lens surfaces are both aspherical and whose lens surface facing the image surface side is concave near the optical axis. Further, a diffractive optical element is formed on one of the lens surfaces of the first lens 29 or the second lens 30.

A transparent parallel plate 34 similar to the parallel plate 6 in Embodiment 1 is disposed between the fourth lens 32 and the image pickup surface S of the image pickup element.

Also in the configuration of the image pickup lens 35 according to the present embodiment, the image pickup lens 35 desirably satisfies the conditional expression (1) mentioned above.

Further, also in the configuration of the image pickup lens 35 according to the present embodiment, the first lens 29 is desirably a biconvex lens.

Further, also in the configuration of the image pickup lens 35 according to the present embodiment, at least the first lens 29 or the second lens 30 on which the diffractive optical element is formed is desirably a plastic lens.

And even from the configuration of the image pickup lens 35 according to the present embodiment, the same effects as those obtained from the configuration of the image pickup lens 7 according to Embodiment 1 can be obtained.

EXAMPLE 5

Hereinafter, the image pickup lens according to the present embodiment will be described in more detail by way of a specific example.

Table 17 below provides a specific numerical example of the image pickup lens of this example. Note that the image pickup lens 35 shown in FIG. 9 is configured based on the data provided in Table 17.

TABLE 17

| Surface number | r (mm) | d (mm) | n | ν |
|---|---|---|---|---|
| Aperture stop | ∞ | 0.000 | — | — |
| 1st surface | 2.279 | 0.973 | 1.53113 | 55.8 |
| 2nd surface* | −6.465 | 0.100 | — | — |
| 3rd surface | 5.325 | 0.461 | 1.607 | 27.59 |
| 4th surface | 1.907 | 0.408 | — | — |
| 5th surface | −22.039 | 1.779 | 1.53113 | 55.8 |
| 6th surface | −1.422 | 0.482 | — | — |
| 7th surface | −7.212 | 0.300 | 1.53113 | 55.8 |
| 8th surface | 1.640 | 0.546 | — | — |
| 9th surface | ∞ | 0.500 | 1.5168 | 64.2 |
| 10th surface | ∞ | 0.0500 | — | — |
| Image surface | ∞ | — | — | — |

Tables 18A and 18B below provide aspherical coefficients (including conic constants) of the image pickup lens of this example.

TABLE 18A

|  | κ | A4 | A6 | A8 |
|---|---|---|---|---|
| 1st surface | −8.179526E−01 | 4.001257E−03 | −2.202514E−03 | −2.918561E−03 |
| 2nd surface* | −6.153793E+01 | 7.738761E−03 | −5.421622E−02 | 5.240281E−02 |
| 3rd surface | 0.000000E+00 | 9.687517E−04 | −6.523900E−02 | 5.161630E−02 |
| 4th surface | −2.566250E+00 | 1.820178E−02 | −2.043777E−02 | 8.337973E−03 |
| 5th surface | 3.370643E+02 | 4.482704E−03 | 3.025361E−03 | −3.090085E−03 |
| 6th surface | −4.058037E+00 | −2.491116E−02 | 1.161538E−02 | −3.519788E−03 |
| 7th surface | 0.000000E+00 | −5.817165E−02 | 1.482618E−02 | −3.905026E−04 |
| 8th surface | −7.989062E+00 | −4.862609E−02 | 1.104810E−02 | −2.247406E−03 |

TABLE 18B

|  | A10 | A12 | A14 |
|---|---|---|---|
| 1st surface | −9.439403E−03 | 4.026553E−02 | −3.365231E−02 |
| 2nd surface* | 2.012572E−02 | −4.303284E−02 | 1.066032E−02 |
| 3rd surface | 5.015763E−02 | −6.857467E−02 | 1.908394E−02 |
| 4th surface | 2.620326E−02 | −1.870576E−02 | 2.771670E−03 |
| 5th surface | −1.016572E−03 | 2.153760E−03 |  |
| 6th surface | 1.927997E−03 | −2.743423E−04 | −8.262038E−06 |
| 7th surface | −1.572583E−04 | 1.118450E−05 |  |
| 8th surface | 2.307285E−04 | −9.524848E−06 |  |

As can be seen from Tables 18A and 18B, in the image pickup lens 35 of this example, the lens surfaces of the first lens 29 to the fourth lens 32 are all aspherical. It should be noted, however, that the image pickup lens 35 is not particularly limited to such a configuration as long as the lens surfaces of the fourth lens 32 are both aspherical.

In Tables 17, 18A and 18B, the surface marked with an asterisk (the second surface: the surface of the first lens 29 facing the image surface side) is a diffractive optical element surface, and a specific numerical example of the diffractive optical element surface is provided in Table 19 below.

TABLE 19

| Design wavelength | 546.07 nm |
|---|---|
| Diffraction order | 1 |
| C2 | −4.513618E−03 |
| C4 | 2.905797E−04 |

In this way, in the image pickup lens 35 of this example, the diffractive optical element is formed on the lens surface of the first lens 29 facing the image surface side but the image pickup lens 35 does not have to be configured as such. The same effect can be achieved even if the diffractive optical element is formed on the lens surface of the first lens 29 facing the object side or on the lens surface of the second lens 30 facing the object side or the image surface side.

Table 20 below provides the F number Fno, the focal length f (mm) of the overall optical system, the overall optical length TL (mm) measured in terms of air, the maximum image height Y' and the value of the conditional expression (1) associated with the image pickup lens 35 of this example.

TABLE 20

| Fno | 2.8 |
|---|---|
| f (mm) | 4.21 |
| TL (in terms of air) (mm) | 5.6 |
| Y' | 2.835 |
| Conditional expression (1) TL/f | 1.33 |

Figure 10:
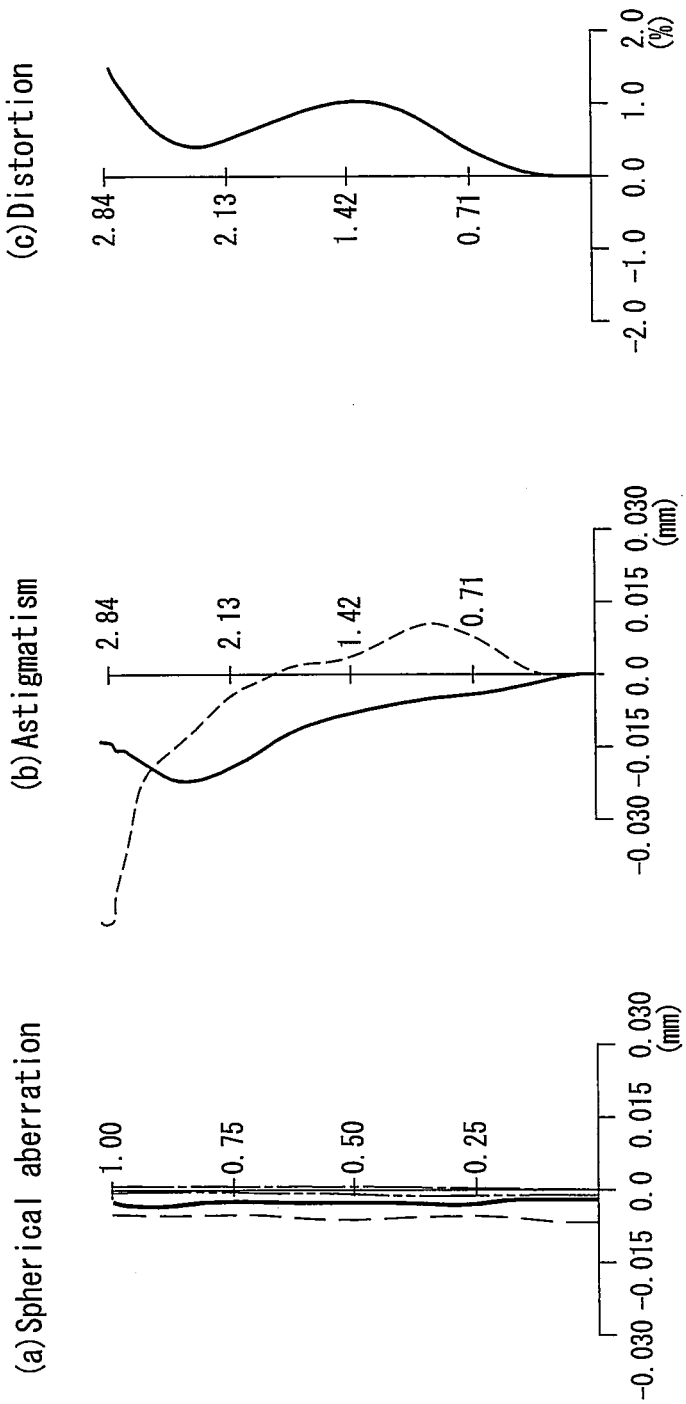
FIG. 10 shows graphs of aberrations associated with an image pickup lens of Example 5 of the present invention.

FIG. 10 shows graphs of aberrations associated with the image pickup lens of this example. FIG. 10(a) is a graph of spherical aberration. In FIG. 10(a), a solid line indicates values at the g line, a short dashed line indicates values at the F line, a chain line indicates values at the e line, a double chain line indicates values at the d line, and a long dashed line indicates values at the C line. FIG. 10(b) is a graph of astigmatism. In FIG. 10(b), a solid line indicates a sagittal field curvature and a dashed line indicates a meridional field curvature. FIG. 10(c) is a graph of distortion. Note that longitudinal chromatic aberration can be read from the graph of spherical aberration in FIG. 10(a).

As can be seen from the graphs of aberration in FIG. 10, the image pickup lens 35 of this example allows favorable correction of a variety of aberrations and is compatible with small high-pixel image pickup elements (e.g., from CCD and CMOS image sensors having a pixel pitch of 1.75 μm and a pixel count of 5 mega pixels to CCD and CMOS image sensors having a pixel pitch of 1.4 μm and a pixel count of 8 mega pixels) incorporated in small portable devices such as mobile phones. Additionally, in view of the results provided in Table 20 above, it is clear that a bright and compact (small, thin) image pickup lens is obtained.

Embodiment 6

Figure 11:
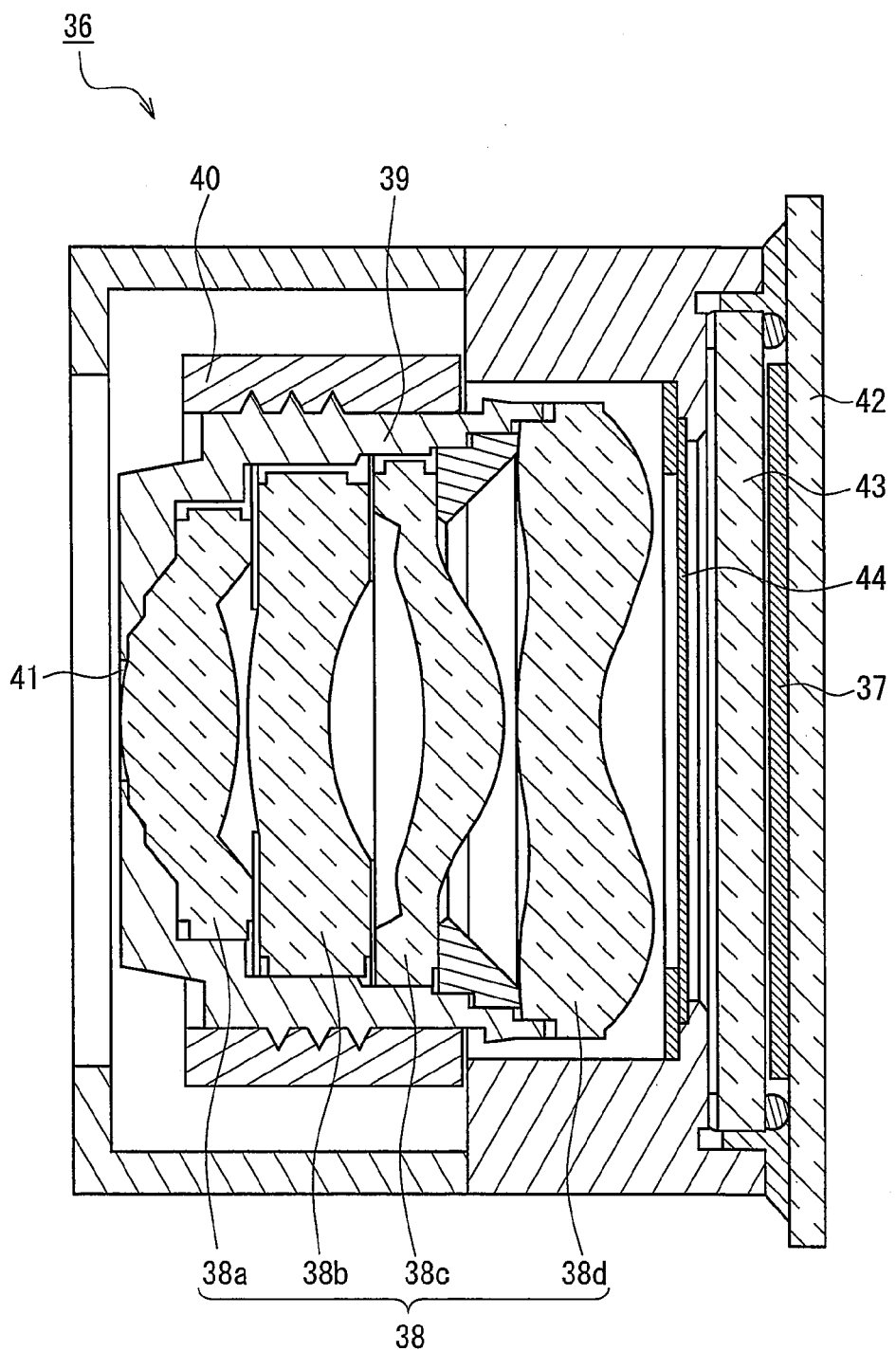
FIG. 11 is a cross-sectional view showing a configuration of an image pickup device according to Embodiment 6 of the present invention.

Next, an image pickup device using the image pickup lens of the present invention will be described with reference to FIG. 11. FIG. 11 is a cross-sectional view showing a configuration of an image pickup device according to Embodiment 6 of the present invention.

As shown in FIG. 11, the image pickup device 36 according to the present embodiment includes an image pickup element 37 and an image pickup lens 38. Here, the image pickup element 37 converts an optical signal corresponding to an object into an image signal and outputs the image signal. Further, the image pickup lens 38 includes, in order from the object side (the left side of FIG. 11) to the image surface side (the right side of FIG. 11): a first lens 38a having positive power; a second lens 38b that is a meniscus lens having negative power and whose lens surface facing the image surface side is concave; a third lens 38c that is a meniscus lens having positive power and whose lens surface facing the image surface side is convex; and a fourth lens 38d that has negative power, whose lens surfaces are both aspherical and whose lens surface facing the image surface side is concave near the optical axis. And a diffractive optical element is formed on one of the lens surfaces of the first lens 38a or the second lens 38b (for specific examples of the first lens 38a to the fourth lens 38d, see Examples 1 to 5 described in Embodiments 1 to 5, respectively).

The image pickup lens 38 is housed in a lens-barrel 39, and the lens-barrel 39 is held by a cylindrical holder 40 through engagement between male screws and female screws. The lens-barrel 39 has an opening 41 on the object side. The opening 41 serves as an aperture stop for the image pickup lens 38.

In FIG. 11, 42 denotes a substrate on which the image pickup element 37 is provided, 43 denotes a faceplate (glass cover) of the image pickup element 37, and 44 denotes an infrared (IR) cut filter.

According to the configuration of the image pickup device 36 of the present embodiment, the image pickup lens of the present invention (e.g., any one of the image pickup lenses 7, 14, 21, 28 and 35 according to Embodiment 1 to 5, respectively) is used as the image pickup lens 35. Thus, it is possible to provide a high-performance and compact image pickup device having high resolution performance.

Embodiment 7

Next, a portable device equipped with the image pickup device of the present invention will be described with reference to FIG. 12. FIG. 12(a) is a plan view and FIG. 12(b) is a rearview showing a configuration of a mobile phone as the portable device according to Embodiment 7 of the present invention.

Figure 12:
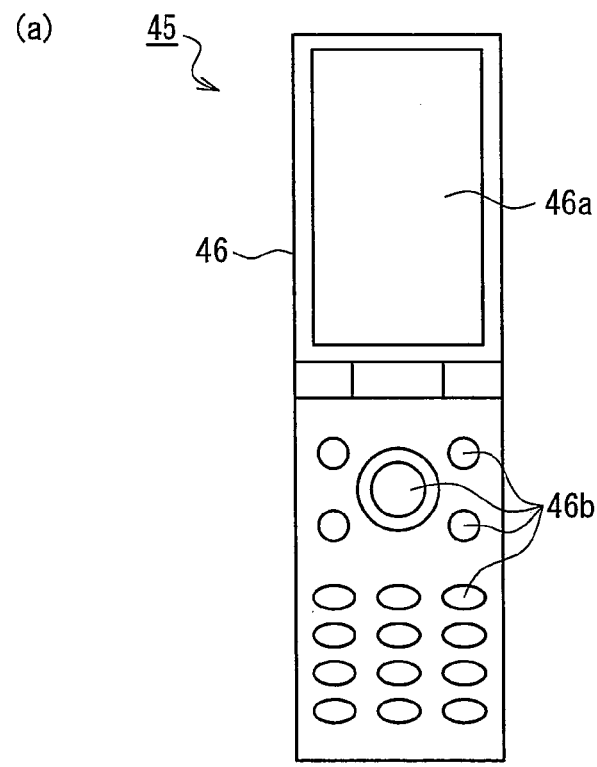
FIG. 12(a) is a plan view and FIG. 12(b) is a rear view showing a configuration of a mobile phone as a portable device according to Embodiment 7 of the present invention.
Figure 12:
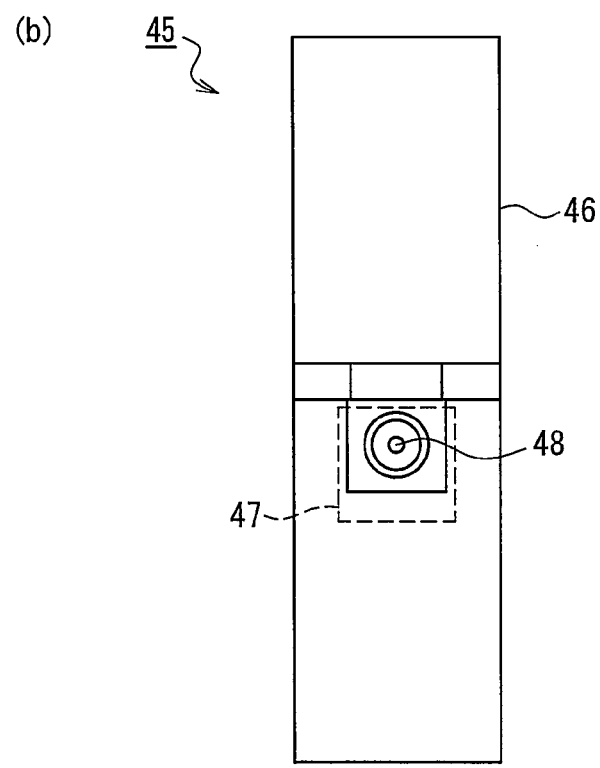

As shown in FIG. 12, the portable device 45 according to the present embodiment is a mobile phone equipped with a camera and includes a case 46, a display 46a and operating portions 46b provided on the case 46, and an image pickup device 47 incorporated in the case 46.

The image pickup device 47 includes an image pickup element and an image pickup lens, and the image pickup element converts an optical signal corresponding to an object into an image signal and outputs the image signal (for a specific example of the image pickup device 47, see Embodiment 6). Here, the image pickup lens includes, in order from the object side (the backside of the portable device 45) to the image surface side (the front side of the portable device 45): a first lens 48 having positive power (see FIG. 12(b)); a second lens that is a meniscus lens having negative power and whose lens surface facing the image surface side is concave; a third lens that is a meniscus lens having positive power and whose lens surface facing the image surface side is convex; and a fourth lens that has negative power, whose lens surfaces are both aspherical and whose lens surface facing the image surface side is concave near the optical axis. And a diffractive optical element is formed on one of the lens surfaces of the first lens 48 or the second lens (for specific examples of the first lens 48 to the fourth lens, see Examples 1 to 5 described in Embodiments 1 to 5, respectively).

According to the configuration of the portable device 45 of the present embodiment, the portable device 45 is equipped with the image pickup device of the present invention (e.g., the image pickup device 36 according to Embodiment 6) as the image pickup device 47. Thus, it is possible to provide a high-performance and compact portable device, such as a mobile phone.

INDUSTRIAL APPLICABILITY

Since the image pickup lens of the present invention is compatible with small high-pixel image pickup elements (e.g., from CCD and CMOS image sensors having a pixel pitch of 1.75 μm and a pixel count of 5 mega pixels to CCD and CMOS image sensors having a pixel pitch of 1.4 μm and a pixel count of 8 mega pixels), it is particularly useful in the field of small portable devices, such as mobile phones, equipped with an image pickup device, which are desired to have high resolution performance.

DESCRIPTION OF REFERENCE NUMERALS

| Description of Reference Numerals | |
|---|---|
| 1, 8, 15, 22, 29, 38a, 48 | first lens |
| 2, 9, 16, 23, 30, 38b | second lens |
| 3, 10, 17, 24, 31, 38c | third lens |
| 4, 11, 18, 25, 32, 38d | fourth lens |
| 5, 12, 19, 26, 33 | aperture stop |
| 6, 13, 20, 27, 34 | parallel plate |
| 7, 14, 21, 28, 35, 38 | image pickup lens |
| 36, 47 | image pickup device |
| 37 | image pickup element |
| 39 | lens-barrel |
| 40 | holder |
| 41 | opening |
| 42 | substrate |
| 43 | faceplate (cover glass) of image pickup element |
| 44 | infrared (IR) cut filter |
| 45 | portable device |
| 46 | case |
| 46a | display |
| 46b | operating portions |
| S | image pickup surface |

The invention claimed is:

1. An image pickup device comprising:
   an image pickup element for converting an optical signal corresponding to an object into an image signal and outputting the image signal, the image pickup element having a pixel pitch of 1.4 to 1.75 μm and a pixel count of 5 to 8 mega pixels; and
   an image pickup lens for forming an image of the object on an image surface of the image pickup element,
   wherein the image pickup lens comprises, in order from the object side to the image surface side:

a first lens having positive power;

a second lens that is a meniscus lens having negative power and whose lens surface facing the image surface side is concave;

a third lens that is a meniscus lens having positive power and whose lens surface facing the image surface side is convex; and a fourth lens that has negative power, whose lens surfaces are both aspherical and whose lens surface facing the image surface side is concave near an optical axis, and a diffractive optical element is formed on one of the lens surfaces of the first lens or the second lens.

2. The image pickup device according to claim 1, wherein the image pickup lens satisfies the following conditional expression (1):

$$TL/f < 1.31 \tag{1}$$

where f is a focal length of an overall optical system, and TL is an overall length of the optical system.

3. The image pickup device according to claim 1, wherein the first lens is a biconvex lens.

4. The image pickup device according to claim 1, wherein at least the first lens or the second lens on which the diffractive optical element is formed is a plastic lens.

5. A portable device equipped with the image pickup device according to claim 1.

* * * * *